(12) United States Patent
Hämäläinen

(10) Patent No.: US 10,508,749 B2
(45) Date of Patent: Dec. 17, 2019

(54) VALVE OF A HYDRAULICALLY STRIKING DEVICE

(71) Applicant: Doofor Oy, Nokia (FI)

(72) Inventor: Jaakko Hämäläinen, Tampere (FI)

(73) Assignee: Doofor Oy, Nokia (FI)

( * ) Notice: Subject to any disclaimer, the term of this patent is extended or adjusted under 35 U.S.C. 154(b) by 1155 days.

(21) Appl. No.: 14/829,847

(22) Filed: Aug. 19, 2015

(65) Prior Publication Data

US 2016/0138728 A1 May 19, 2016

(30) Foreign Application Priority Data

Aug. 19, 2014 (EP) .................................... 14181372

(51) Int. Cl.
| | |
|---|---|
| *F16K 21/04* | (2006.01) |
| *B25D 9/20* | (2006.01) |
| *E21B 4/14* | (2006.01) |
| *B23P 15/00* | (2006.01) |
| *E21B 1/02* | (2006.01) |
| *E21B 7/02* | (2006.01) |

(52) U.S. Cl.
CPC ............ *F16K 21/04* (2013.01); *B23P 15/001* (2013.01); *B25D 9/20* (2013.01); *E21B 1/02* (2013.01); *E21B 4/14* (2013.01); *E21B 7/025* (2013.01)

(58) Field of Classification Search
CPC ... F16K 21/04; F03C 1/14; B25D 9/20; E21B 1/02; E21B 4/14
USPC .......................................................... 92/218
See application file for complete search history.

(56) References Cited

U.S. PATENT DOCUMENTS

| | | |
|---|---|---|
| 4,172,411 A | 10/1979 | Matsuda et al. |
| 5,014,796 A | 5/1991 | Gustafsson |
| 5,056,606 A | 10/1991 | Barthomeuf |
| 5,277,264 A | 1/1994 | Song et al. |
| 5,301,761 A | 4/1994 | Fu et al. |
| 5,715,897 A | 2/1998 | Gustafsson |
| 6,135,216 A | 10/2000 | Lyon et al. |

(Continued)

FOREIGN PATENT DOCUMENTS

| | | |
|---|---|---|
| CN | 1756888 A | 4/2006 |
| CN | 1836088 A | 9/2006 |

(Continued)

OTHER PUBLICATIONS

Extended European Search Report for European Patent Application No. 14181371.7 dated Jan. 30, 2015, 7 pages.

(Continued)

*Primary Examiner* — Michael Leslie
*Assistant Examiner* — Daniel S Collins
(74) *Attorney, Agent, or Firm* — Alston & Bird LLP

(57) ABSTRACT

A valve of a hydraulically striking device having a housing, the housing comprising a moving member being seated inside the housing to move in a reciprocating manner by means of a hydraulic fluid. The moving member has an inner space, the valve has a return space and a pressure space provided, in the axial direction, at a distance from one another on the inner surface of the housing facing the moving member, wherein the rest of the inner surface of the housing in the same axial positions of the return space and the pressure space forms guide surfaces that are concentric with the moving member and against the moving member for centering the moving member.

19 Claims, 5 Drawing Sheets

(56) References Cited

U.S. PATENT DOCUMENTS

| | | |
|---|---|---|
| 6,799,641 B1 | 10/2004 | Lyon et al. |
| 7,681,664 B2 | 3/2010 | Patterson et al. |
| 2004/0188146 A1* | 9/2004 | Egerstrom ................ E21B 4/14 175/296 |
| 2012/0006598 A1 | 1/2012 | Lyon et al. |

FOREIGN PATENT DOCUMENTS

| | | |
|---|---|---|
| CN | 102852455 A | 1/2013 |
| WO | WO 2013/028079 A1 | 2/2013 |

OTHER PUBLICATIONS

Extended European Search Report for European Patent Application No. 14181372.5 dated Feb. 3, 2015, 6 pages.
Extended European Search Report for European Patent Application No. 14181374.1 dated Feb. 3, 2015, 7 pages.
Catalog p. CP720-5, Directional Control Valves, DV-34, 11141719 (Ref AA) (Nov. 2013) 1 page.

* cited by examiner

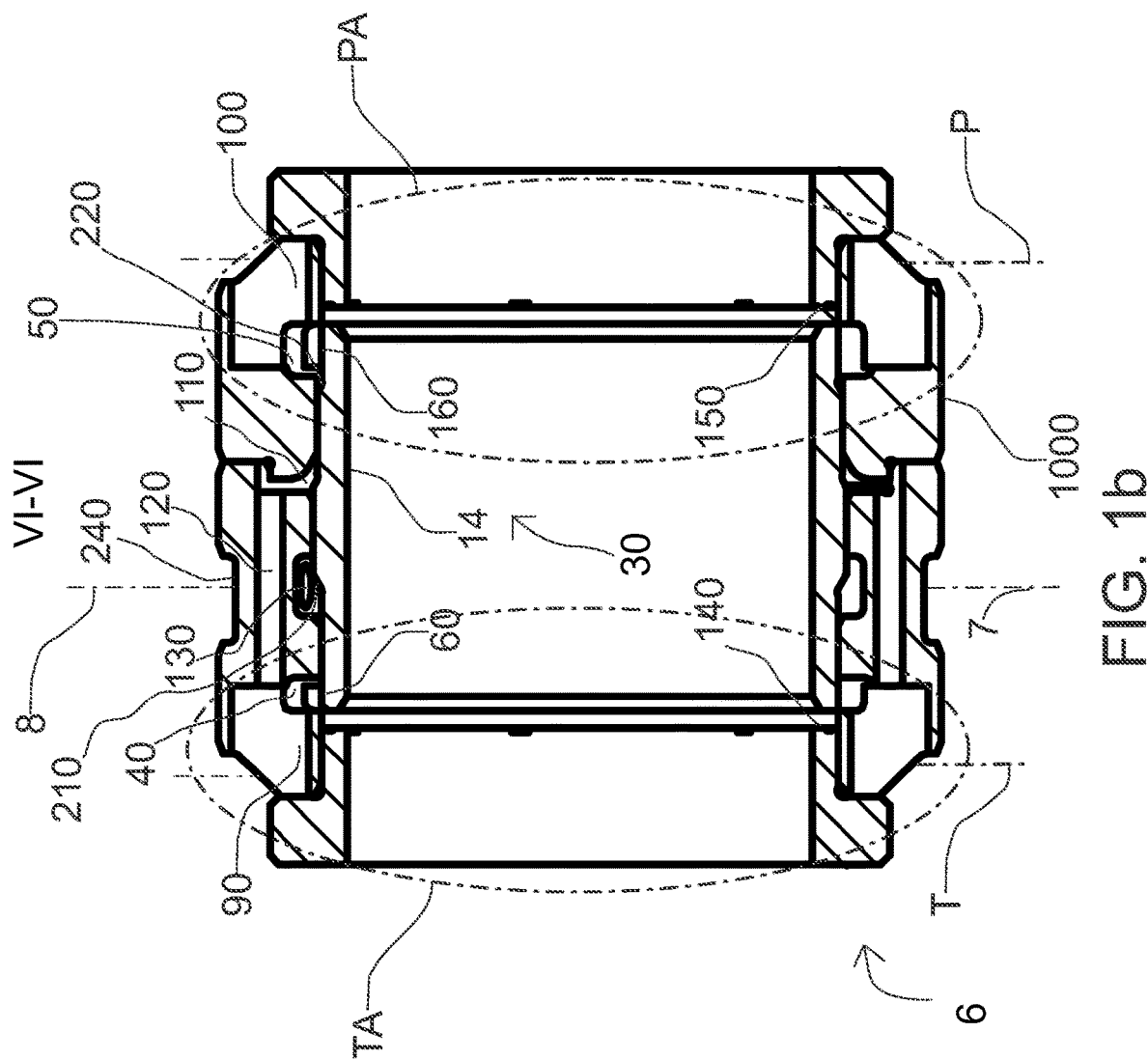

VALVE OF A HYDRAULICALLY STRIKING DEVICE

FIELD OF THE INVENTION

The present invention relates to a valve of a hydraulically striking device and its components, and a method of manufacturing the valve, where the hydraulically striking device may be used for striking on a material hydraulically for example in rock drilling or similar applications.

BACKGROUND OF THE INVENTION

There are various types of valves for hydraulically striking devices on the market. Similar for many of these hydraulically striking devices may be that there is a piston that hydraulically reciprocates between a first position and a second position and that movement is controlled hydraulically with a controlling arrangement which is in connection with the device, which controlling arrangement may be a valve for example inside the device. This valve comprises a moving member, a device that moves back and forth inside the housing of the valve. The moving member controls the fluid flow that is needed for moving the piston. The valve is operated by means of hydraulic pressure.

Hydraulically striking devices are used in the hydraulic machines that are, for example, working in rock drilling or similar applications. Rock drilling is usually performed in mines and construction plants. In some of the mining plants, it is not uncommon that they can produce hundreds of thousands of tons of ore from the rock in a year. The hydraulically striking device is also used for drilling and sampling, general excavations, tunneling work and roof bolting. On the work site, the hydraulically striking device can be used for drilling of rock. One example of test results of one rock drilling equipment working on the drilling site shows typical operating values of the machine equipped with one model-size hydraulically striking device such as a penetration rate of around 2 meters/minute in granite with a drill hole diameter of around 50 mm when using a percussion pressure from around 100 bar up to 200-300 bar. On the drill site, around or over 100 mm holes are not uncommon for the rock drilling equipment.

Usually, a valve is provided inside the hydraulically striking device and is designed to last in the hard working environment of the machine. The valve is usually larger than a standard-size screw-in cartridge valve, robust and strongly built, as the hydraulically striking device can strike generally from 30 to 100 times in a second. The device can weigh up to hundreds of kilos. But in the future, bigger and heavier models are needed when the demands from the industry rise. Also, demands for a higher striking force with lower flows raise the demands for the equipment so that the operating pressures of the hydraulically striking device can be at a relatively high level.

But in many of these valves it may be a problem that the spool is not guided near the ends of the spool. In this case, when the spool moves it may get stuck on the structures near the ends of the spool or the spool may wear more as the spool is not adequately guided. This is because the spool may move slightly radially and so the ends may be in contact with the structures near the ends. This marginal movement may sound insignificant but it may cause problems or malfunction in operation, as the valve functions other than normally and the whole operation of the hydraulically striking device is abnormal. The spool may move rapidly inside the valve and the spool may be sensitive to interference that may be caused by unguided sections in the spool housing. This may mean that the spool may not be adequately centered inside the housing of the valve.

In these valves of hydraulically striking devices, there is in some case, a limited amount of space in the valve to drill the necessary one or more connection channels that connect the circuit from the hydraulically striking device to the circuit of the valve housing for example in the axial direction of the valve. In this case, some of the channels are forced to be arranged outside the valve into the hydraulically striking device housing. This increases the costs of manufacturing the device and makes the circuit of the device more complex, which also increases the costs. In some cases, if axial channels are wanted in the valve housing the size of the valve has to be increased and this increases the space needed for the valve inside the device. This causes an increase in the manufacturing cost, as the amount of material needed for the valve is also increased. The increased size is a problem in applications where the size of the hydraulically striking device has to be limited.

In some cases, there are problems of the strength of the housing of the valve. In this case, in places where only a little material thickness is left for example in between the outer surface of the housing and some structural forms inside the housing there is a possibility of weakness. Because the valve is most of the time under the influence of the pressure of the hydraulic fluid, in time there can be a situation where the housing of the valve cracks if there is a high pressure spike in the hydraulic system of the device, for example a result of a malfunction or a substantially hard operation. The crack can be a result of material fatigue in the weak points of the housing of the valve.

The objective of the invention is to eliminate or at least alleviate the problems mentioned above and introduce solutions for them.

SUMMARY OF THE INVENTION

According to a first aspect of the invention, there is provided a valve of a hydraulically striking device comprising a housing, the housing comprising a moving member being seated inside the housing to be moved in a reciprocating manner by means of a hydraulic fluid. The moving member comprises an inner space, wherein the valve comprises a return space and a pressure space provided, in the axial direction, at a distance from one another on the inner surface of the housing against the moving member, wherein the rest of the inner surface of the housing in the same axial positions of the return space and the pressure space forms guide surfaces that are concentric with the moving member and against the moving member for centering the moving member.

According to a second aspect of the invention, there is provided a valve of a hydraulically striking device comprising a housing, the housing comprising a moving member being seated inside the housing to be moved in a reciprocating manner by means of a hydraulic fluid. The moving member comprises an inner space, the valve comprises a return space and a pressure space provided, in the axial direction, at a distance from one another on the inner surface of the housing against the moving member, wherein the rest of the inner surface of the housing in the same axial positions of the return space and the pressure space forms guide surfaces that are concentric with the moving member and against the moving member for centering the moving member, wherein the moving member are arranged alternately to open, in different positions of the moving member, the connection of the return space and of the pressure space to the inner space.

According to a third aspect of the invention, there is provided a valve of a hydraulically striking device comprising a housing, the housing comprising a spool or a poppet or a combination of a spool and a poppet being seated inside the housing to be moved in a reciprocating manner by means of a hydraulic fluid. The spool or the poppet or the combination of the spool and the poppet comprises an inner space, the valve comprises a return space and a pressure space provided, in the axial direction, at a distance from one another on the inner surface of the housing facing the spool or the poppet or the combination of the spool and the poppet, wherein the rest of the inner surface of the housing in the same axial positions of the return space and the pressure space forms guide surfaces that are concentric and against the spool or the poppet or the combination of the spool and the poppet for centering the spool or the poppet or the combination of the spool and the poppet. The spool or the poppet or the combination of the spool and the poppet is arranged alternately to open, in different positions of the spool or the poppet or the combination of the spool and the poppet, the connection of the return space and of the pressure space to the inner space.

In one embodiment of the invention, the housing of the valve is formed of at least two parts to provide for the assembling of the moving member inside the housing. In one embodiment of the invention, the valve comprises at least a second return space and at least a second pressure space is provided, in the axial direction, at a distance from one another on the inner surface of the housing against the moving member, wherein guide surfaces of the return space that are concentric with the moving member are formed between the first return space and the second return space for centering the moving member and wherein guide surfaces of the pressure space that are concentric with the moving member are formed between the first pressure space and the second pressure space for centering the moving member. The moving member is arranged alternately to open, in different positions of the moving member, the connection of the first and the second return space and of the first and the second pressure space to the inner space. In one embodiment of the invention, the guide surfaces are formed substantially near the ends of the moving member. Substantially near the ends means for example less than 10 mm from each end of the moving member.

In one embodiment of the invention, the housing comprises a pressure arrangement and a return arrangement of the hydraulic fluid wherein the pressure space is connected to the pressure arrangement, in which the pressure of the pressure line of the hydraulically striking device acts, and the return space is connected to the return arrangement, which is connected to the return line of the hydraulically striking device. In one embodiment of the invention, the return line leads to the tank of the hydraulic system of the hydraulically striking device. In one embodiment of the invention, there are one or more spaces in both of the pressure arrangement and return arrangement of the housing, and the number of these spaces is determined by the flow that is needed for the hydraulically striking device to operate. In one embodiment of the invention, there are one or more return spaces and pressure spaces in each arrangement, and the number of these spaces is determined by the speed of the piston of the hydraulically striking device that is needed for the hydraulically striking device to operate.

In one embodiment of the invention, at least one return channel opens into the return space and at least one pressure channel opens into the pressure space, the channels being disposed axially relative to the moving member. In one embodiment of the invention, the housing comprises a groove into which a connecting channel opens and is arranged to be connected axially to the return channel and to the return space. In one embodiment of the invention, the connecting channel is concentric with the return channel.

In one embodiment of the invention, the position of the return channel and of the connecting channel in the housing is provided according to the position of the return space, and the position of the pressure channel in the housing is provided according to the position of the pressure space. In one embodiment of the invention, the place of the return channel and the connecting channel in the housing of the valve is provided in proximity to the area of the return space and provided in connection with the mentioned space. In proximity to the area of the return space means that it is substantially near the inside surface of the mentioned space, for example less than 20 mm from the mentioned surface. In one embodiment of the invention, the place of the pressure channel in the housing of the valve is provided in proximity to the area of the pressure space and provided in connection with the mentioned space. In proximity to the area of the pressure space means that it is substantially near the inside surface of the mentioned space, for example less than 20 mm from the mentioned surface. In one embodiment of the invention, the return space and the pressure space are provided symmetrically in the housing around the moving member. In one embodiment of the invention, the housing comprises a first sealing surface and a second sealing surface, wherein the moving member moves between the sealing surfaces.

In one embodiment of the invention, the housing comprises a control groove, which pressure-controls the moving member in different positions. In one embodiment of the invention, the control groove is connected to a first control channel and to a second control channel of the hydraulically striking device. In one embodiment of the invention, the moving member is moved to a different position by the pressure in the pressure space when the pressure is not acting on the control channel or the pressure is at a substantially low pressure level. In one embodiment of the invention, the housing comprises a control groove, wherein the control surface area of the pressure in the control groove for moving the moving member is greater than the surface area of the pressure in the pressure space for moving the moving member.

In one embodiment of the invention, the housing is annular and acts as a valve casing. In one embodiment of the invention, the moving member is annular. In one embodiment of the invention, the housing and/or the moving member is/are (a) sleeve-like component(s).

In one embodiment of the invention, the pressure space and the return space are axial grooves made in the housing. In one embodiment of the invention, the return space and the pressure space are provided in the housing non-centrally relative to the moving member.

In one embodiment of the invention, the valve is a valve of a rock drilling machine. In one embodiment of the invention, the hydraulic fluid in the inner space is in fluid communication with an inner end of the piston of the hydraulically striking device. In one embodiment of the invention, the inner end of the piston is in the inner space of the moving member. In one embodiment of the invention, the valve is placed concentrically with the piston of the hydraulically striking device.

In one embodiment of the invention comprising the rock drilling machine, wherein the rock drilling machine further comprises a piston configured to move inside the rock drilling machine in a reciprocating manner, wherein the piston comprises an inner end located inside the rock drilling machine, a second portion, which is arranged to the piston to extend after the inner end in a larger diameter than the inner end, wherein the rock drilling machine comprises an inner return space located inside the rock drilling machine around the second portion of the piston, wherein the inner end moves along with the piston inside the valve in the inner space and the second portion moves along with the piston in the inner return space of the rock drilling machine, wherein the inner return space is connected to the same pressure as effected in the return space via the return channel.

In one embodiment of the invention, the moving member is the spool of the valve or the poppet of the valve or the combination of the spool and the poppet of the valve.

According to a fourth aspect of the invention, there is provided a method for manufacturing the valve of a hydraulically striking device according to the first aspect of the invention. According to the method the return space is formed by making in the housing an axial groove of the return space that is non-central relative to the moving member, and the pressure space is formed by making in the housing an axial groove of the pressure space that is non-central relative to the moving member.

The valve of a hydraulically striking device described here has many significant advantages comparing to the prior art. The moving member of the valve is guided properly in the housing of the valve. Part of the inner surface of the return space and of the pressure space in the same radial position forms guide surfaces that guide the moving member substantially near the ends of the moving member. With the mentioned guide surfaces, the radial movement of the moving member is eliminated or at least reduced to a minimal level. The housing of the moving member has a centering function near both ends of the moving member that accomplishes to keep movement of the moving member more in the axial direction. This function is advantageous because it reduces the possibility of the moving member getting stuck in structures of the housing near the ends of the moving member. This function also reduces the risk of wearing of the moving member when it operates inside the valve housing. Wearing of metal components is unwanted because it changes the shape of the component and creates metal chips in the fluid and leakage in the system. Metal chips and leakage create malfunction and unwanted operation in a hydraulic system. Because the moving member has a centering function near the ends of the moving member, this makes the operation of the valve more reliable. The moving member moves at a substantially high speed inside the housing and in this case it is advantageous that the moving member is configured to move as reliably as possible, as the operation environment is substantially rough when it is used for example in rock drilling applications.

Because the pressure space and the return space are formed into the housing so that the spaces are lifted outwards in radial directions from the surface that is towards the moving member towards the outer surface of the housing, there is a possibility to drill an axial channel that connects to the pressure space or to the return space without making the size of the component much bigger. Because the pressure space and/or return space are lifted as described above, the axial channel is possible to be connected to the mentioned space. When the axial channel connects to the return space, it is possible to drill another channel that is for example concentric with the axial channel and that connects to other structures like a groove inside the valve housing. This enables reducing of features from the housing of the hydraulically striking device and integrating of these features into the valve without making the valve much bigger. This also reduces the complexity of the circuit of the cylinder housing of the hydraulically striking device because some of the features are already integrated into the valve. This also enables the reduction of the manufacturing cost.

In the places where the housing forms one or more guide surfaces with the moving member, the material thickness of the housing is increased. In these places, the strength of the material is increased, and this reduces the need of increasing the size of the housing. The increased strength of the housing reduces the risk of a crack appearing in the housing when the valve is in operation.

The embodiments of the invention described herein may be used in any combination with each other. Several or at least two of the embodiments may be combined together to form a further embodiment of the invention. A method or a device to which the invention is related may comprise at least one of the embodiments of the invention described hereinbefore.

Any of the above embodiments or modifications can be applied singly or in combination to the respective aspects to which they refer, unless they are explicitly stated as excluding alternatives.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings:

FIGS. 1a-1d are simplified illustrations of a valve of a hydraulically striking device;

DETAILED DESCRIPTION OF THE INVENTION

Figure 1D:
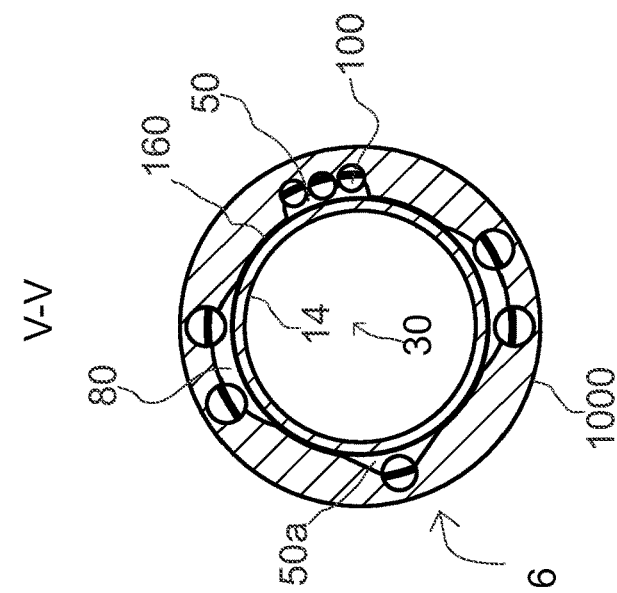

Reference will now be made in detail to the embodiments of the present invention, examples of which are illustrated in the accompanying drawings.

FIGS. 1a to 1d and 2a and 2b illustrate an example of a valve 6 of a hydraulically striking device comprising a housing 1000, the housing 1000 comprising a moving member 14 being seated inside the housing 1000 to be moved in a reciprocating manner by means of a hydraulic fluid. The moving member 14 comprises an inner space 30, the valve 6 comprises a return space 40 and a pressure space 50 provided, in the axial direction, at a distance from one another on the inner surface of the housing 1000 facing the moving member 14, wherein the rest of the inner surface of the housing 1000 in the same axial positions of the return space 40 and the pressure space 50 forms guide surfaces 60, 160 that are concentric with the moving member 14 and against the moving member 14 for centering the moving member 14. The moving member 14 is arranged alternately to open, in different positions of the moving member 14, the connection of the return space 40 and of the pressure space 50 to the inner space 30. The guide surfaces 60, 160 are formed substantially near and/or for example less than 10 mm from each end of the moving member.

The valve 6 further comprises at least a second return space 70 and at least a second pressure space 80 provided, in the axial direction, at a distance from one another on the inner surface of the housing 1000 against the moving member 14, wherein guide surfaces of the return space 60 that are concentric with the moving member 14 and against the moving member 14 are formed between the first return space 40 and the second return space 70 for centering the moving member 14 and wherein guide surfaces of the pressure space 160 that are concentric with the moving member 14 and against the moving member 14 are formed between the first pressure space 50 and the second pressure space 80 for centering the moving member 14. The moving member 14 is arranged alternately to open, in different positions of the moving member 14, the connection of the first and the second return space 40, 70 and of the first and the second pressure space 50, 80 to the inner space 30.

Figure 1C:
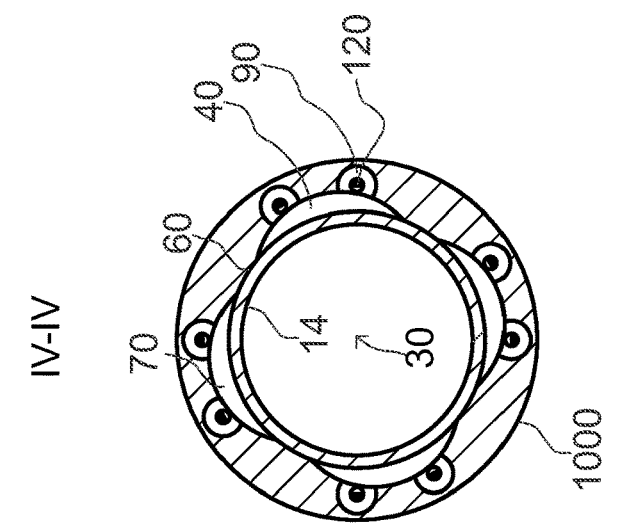
Figure 1A:
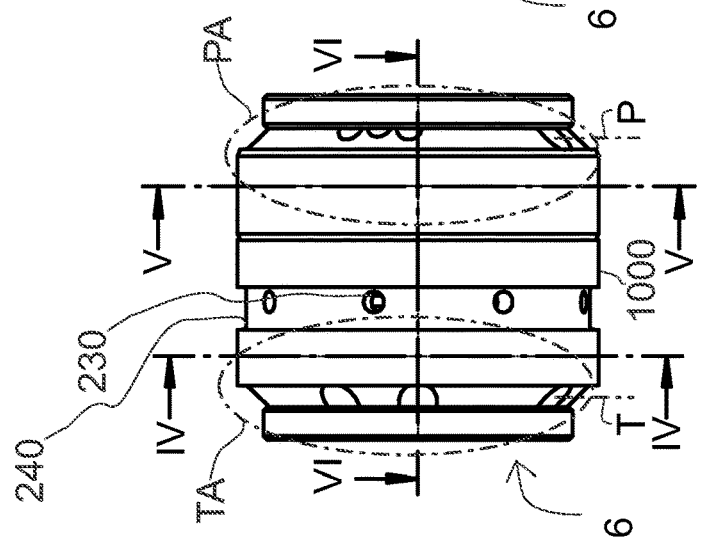

The shape of the return spaces 40, 70 and the pressure spaces 50, 80 can be implemented in various ways. FIG. 1a illustrates the location of the different cross-sections of the valve 6. FIG. 1b illustrates a cross-section of the valve 6 on the location of the return spaces 40, 70, where the return spaces 40, 70 are described as arch-like structures. There the guide surfaces of the return space 60 are formed between the return spaces 40, 70. FIG. 1c illustrates a cross-section of the valve 6 on the location of the pressure spaces 50, 80, where the first pressure space 50 is described as a substantially rectangular structure and the second pressure space 80 is described as an arch-like structure. There the guide surfaces of the pressure space 160 are formed between the pressure spaces 50, 80. Another example of a pressure space is indicated with reference number 50a which is a triangular structure. Also, in FIG. 1d the guide surfaces of the pressure space 160 are formed between the pressure spaces 50, 50a, 80.

The housing 1000 comprises a pressure arrangement PA and a return arrangement TA of the hydraulic fluid, wherein the pressure space 50, 80 is connected to the pressure arrangement PA, in which the pressure of the pressure line P of the hydraulically striking device acts, and the return space 40, 70 is connected to the return arrangement TA, which is connected to the return line T of the hydraulically striking device. Pressure arrangement PA and tank arrangement TA are indicated in FIGS. 1a and 1b with a dash-dotted ellipse. Pressure line P and return line T is indicated with a vertical dash-dotted line. The return line T may lead to the tank of the hydraulic system of the hydraulically striking device. There may be several pressure spaces 50 in the pressure arrangement PA. There may be several return spaces 40 in the return arrangement TA. The number of both of these mentioned spaces 40, 50 may be determined by the level of flow of the fluid to the piston 3 of the hydraulically striking device needed for it to operate. The number of both of these mentioned spaces 40, 50 may be determined by the needed velocity of the piston 3 or the pressure drop in the spaces when the hydraulic fluid flows to them.

FIG. 1b illustrates a cross-section of the valve 6 in the middle of the valve 6. At least one return channel 90 opens into the return space 40, 70 and at least one pressure channel 100 opens into the pressure space 50, 80, the channels being disposed axially relative to the moving member 14 illustrated in FIG. 1b. One or more return channels 90 connect the return space 40, 70 to the return line T of the hydraulically striking device and one or more pressure channels 100 connect the pressure space 50, 80 to the pressure line P of the hydraulically striking device. The housing 1000 comprises a groove 110 into which a connecting channel 120 opens and is arranged to be connected axially to the return channel 90 and to the return space 40. The connecting channel 120 is concentric with the return channel 90. The connecting channel 120 may be arranged non-centrally with the return channel 90, but then it may have to be arranged in proximity to the return channel 90. Because this connecting channel 120 is already integrated into the valve 6, there may be no need of making that connection into the cylinder housing of the hydraulically striking device.

The position of the return channel 90 and of the connecting channel 120 in the housing 1000 is provided according to the position of the return space 40, 70, and the position of the pressure channel 100 in the housing 1000 is provided according to the position of the pressure space 50, 80. The place of one or more return channels 90 and the connecting channel 120 in the housing 1000 of the valve 6 is provided in proximity to the area of the return space 40, 70 and/or substantially near the inside surface of the mentioned space, for example less than 20 mm from the mentioned surface, and provided in connection with the mentioned space 40, 70. The place of one or more pressure channels 100 in the housing 1000 of the valve 6 is provided in proximity to the area of the pressure space 50, 80 and/or substantially near the inside surface of the mentioned space, for example less than 20 mm from the mentioned surface, and provided in connection with the mentioned space 50, 80. The return space 40, 70 and the pressure space 50, 80 are provided symmetrically in the housing 1000 around the moving member 14. The housing 1000 comprises a first sealing surface 140 and a second sealing surface 150, wherein the moving member moves between the sealing surfaces 140, 150. The housing 1000 is formed from at least two parts.

FIG. 1b illustrates that the housing 1000 comprises a control groove 130, which pressure-controls the moving member 14 in different positions. In FIGS. 1a to 1d and 2a and 2b, the moving member 14 is moved to a different position by the pressure in the pressure space 50, 80 when the pressure is not acting on the control groove 130 or the fluid in the control groove 130 is at a substantially low pressure level.

The housing 1000 comprises a control groove 130, wherein a control surface area of the pressure 210 in the control groove 130 for moving the moving member 14 is greater than a surface area of the pressure 220 in the pressure space 50, 80 for moving the moving member 14. When the pressure acts on the control groove 130 it also acts on the control surface area of the pressure 210 in the moving member 14, and when the pressure acts on the pressure space 50, 80 it also acts on the surface area of the pressure 220 in the moving member 14. When the pressures that are acting on both of the mentioned pressure areas 210, 220 are equal, the force created in the control surface area of the pressure 210 in the control groove 130 location is greater than in the surface area of the pressure 220 in the pressure space 50, 80 location; consequently, the moving member moves towards the pressure space 50, 80. At this moment, the fluid flows from the inner space 30 into the return space 40, 70 and so to the return arrangement TA, which leads to the return line T of the hydraulically striking device. The reason is that the moving member 14 opened a passage from the inner space 30 into the return space 40, 70.

The area where the pressure acts is less in the pressure space 50, 80 because the connecting channel 120 connects the return space 50, 80 and so the tank pressure to the groove 110. When the control groove 130 is at a substantially low pressure, the pressure acting on the surface area of the pressure 220 in the moving member 14 moves the moving member towards the return space 40, 70. The reason is that there is no force or there is a substantially low force acting on the control surface area of the pressure 210. At this moment, there is a connection between the inner space 30 and the pressure space 50, 80; therefore, a connection to the pressure arrangement PA, which leads to the pressure line P of the hydraulically striking device, is established. The reason is that the moving member 14 opened a passage from the inner space 30 to the pressure space 50, 80.

A first control channel 7 and a second control channel 8 are in fluid communication with the control groove 130. The fluid communication is established via one or more radial holes 230, which is/are placed in a surface groove 240 in the housing 1000 illustrated in FIGS. 1a and 1b. The surface groove 240 goes around the housing 1000. The control channels 7, 8 are referenced with dash-dot lines in FIG. 1b. The pressure in the control channels 7, 8 is acting on the control surface area of the pressure 210. In the example of the valve in FIG. 1b, the first control channel 7 can be connected either to the pressure line P or to the return line T. In the example of the valve in FIG. 1b, the second control channel can be blocked or connected to the return line T. The pressure line P and the return line T are indicated with dash-dot lines in FIG. 1b.

The housing 1000 is annular and acts as a valve 6 casing. The moving member 14 is annular. The housing 1000 and/or the moving member 14 is/are (a) sleeve-like component(s).

The pressure space 50, 80 and the return space 40, 70 are axial grooves made in the housing 1000. The return space 40, 70 and the pressure space 50, 80 are provided in the housing 1000 non-centrally relative to the moving member 14.

Figure 2A:
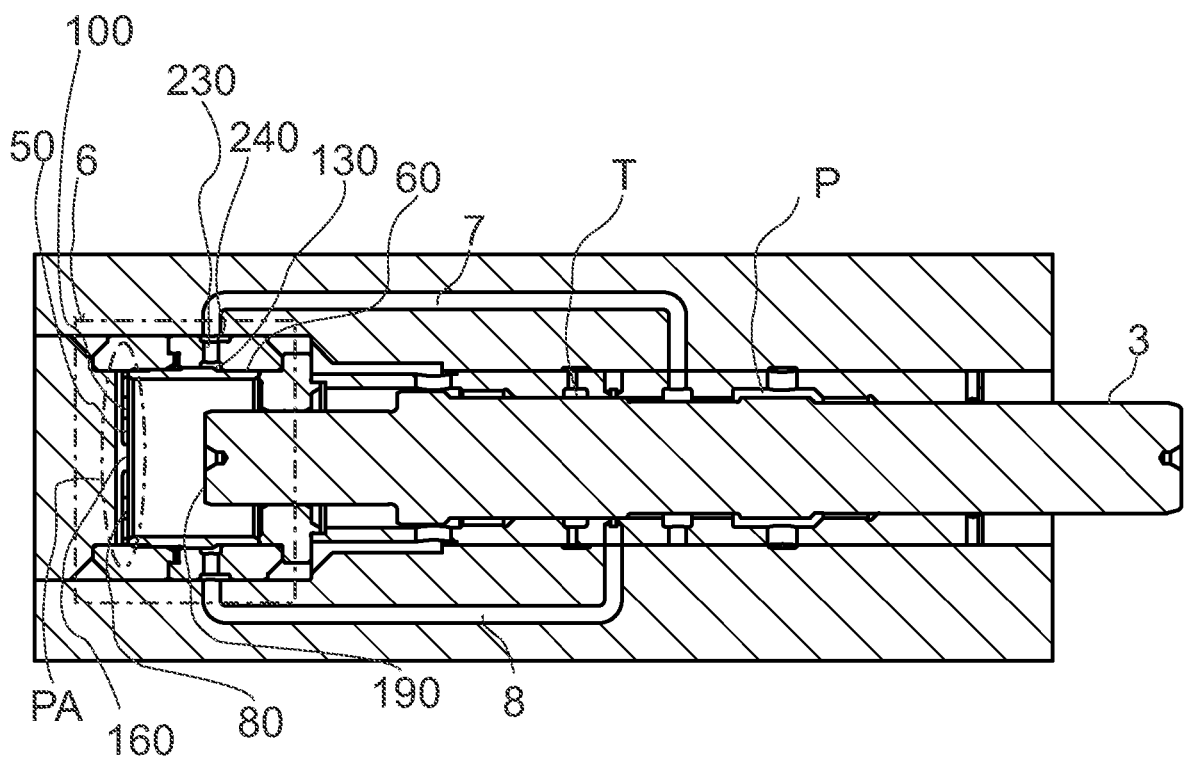
FIGS. 2a-2b are illustrations of a cross-section of a hydraulically striking device where the valve is marked with a dash-dotted box.
Figure 2B:
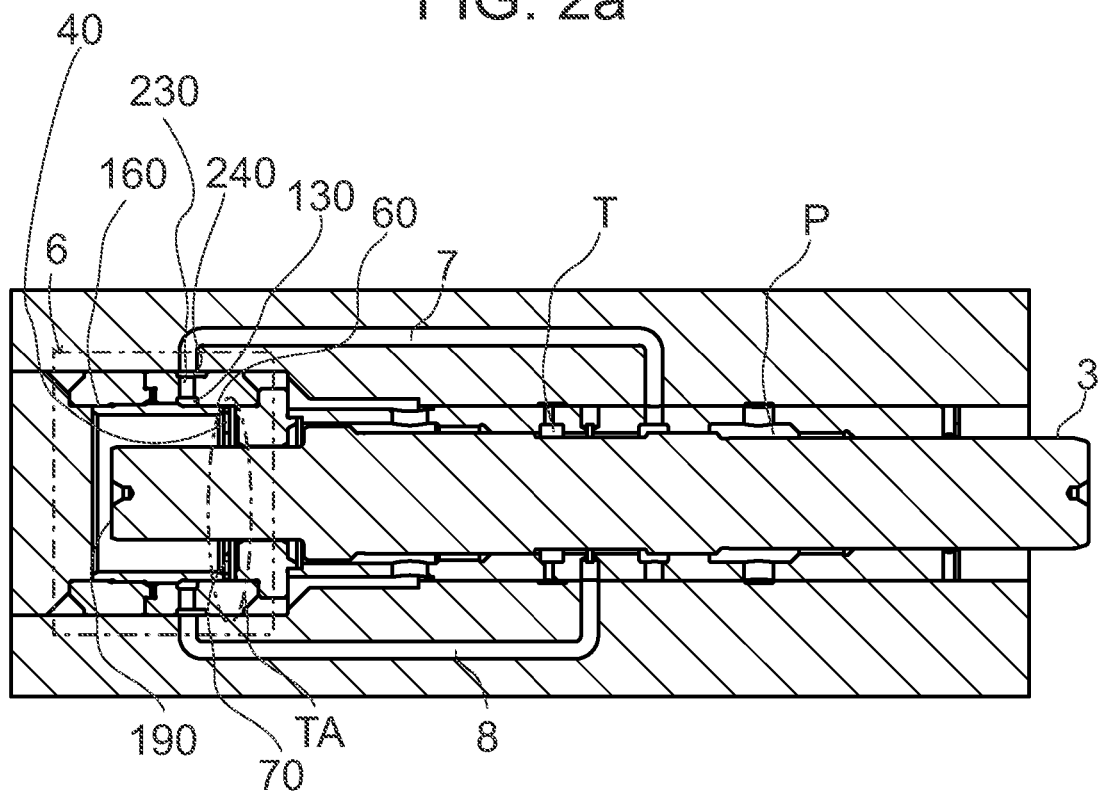

FIGS. 2a and 2b illustrate a cross-section of a hydraulically striking device, where FIG. 2a is the first position of the piston 3 and FIG. 2b is the second position of the piston 3, where the valve 6 is indicated inside a dashed-dotted box. Pressure arrangement PA and tank arrangement TA are indicated in FIGS. 2a and 2b with dash-dotted ellipses. For the sake of clarity, the reference numbers inside the dash-dot box, which indicates the structures of the valve 6, are not all indicated in FIGS. 2a and 2b, because the reference numbers are already described in FIGS. 1a to 1d. The control groove 130 is connected to a first control channel 7 and to a second control channel 8 of the hydraulically striking device. The first control channel 7 and the second control channel 8 connect to the control groove 130 on both sides of the valve 6. In FIGS. 2a and 2b, it is clearly indicated that the control channels 7, 8 are connected to the same space in the control groove 130 via the surface groove 240 and via one or more radial holes 230.

The hydraulic fluid in the inner space 30 is in fluid communication with an inner end 190 of the piston 3 of the hydraulically striking device. The inner end 190 of the piston 3 is in the inner space 30 of the moving member 14. The valve 6 is placed concentrically with the piston 3 of the hydraulically striking device. The moving member 14 directs the fluid from the inside space 30 to the pressure arrangement PA or to the return arrangement TA. This is controlled by the pressure in the control channels 7, 8 and in the control groove 130. The moving member 14 tries not to keep the pressure space 50, 80 and the return space 40, 70 open to the inner space 30 at the same time, or at some moment of time the moving member keeps the pressure space 50, 80 and the return space 40, 70 open to the inside space 30, but only for a substantially short amount of time of the work cycle. The moving member 14 blocks either of the spaces and seals itself when the moving member is towards either of the sealing surfaces 140, 150.

The valve 6 may be used for example in a rock drilling machine. The valve 6 is needed in the device to supply the correct timing of the piston 3 in the work cycle of the piston 3.

Figure 3:
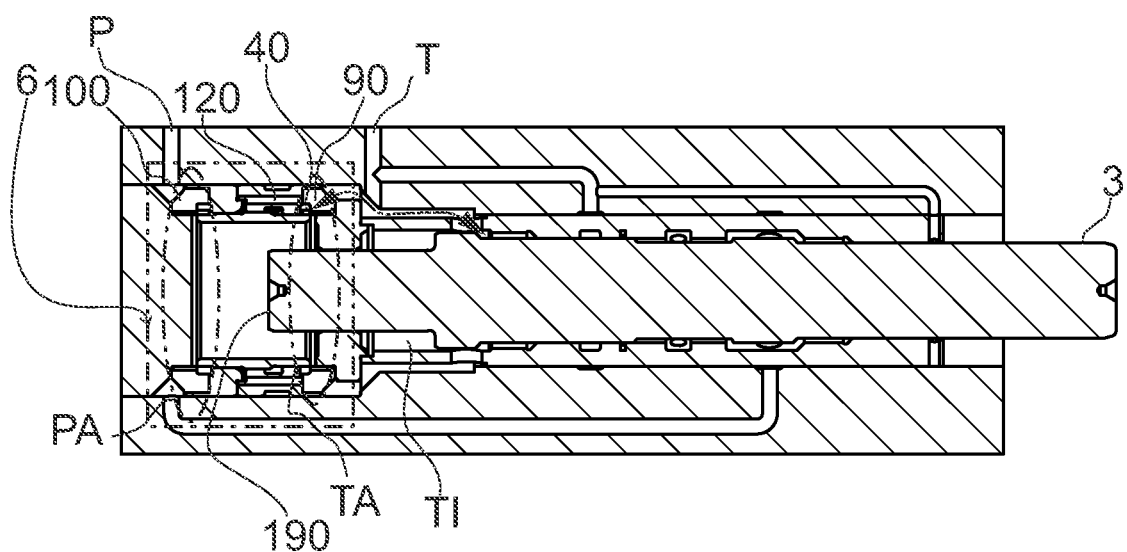
FIG. 3 is an illustration of another cross-section of a rock drilling machine where the valve is marked with a dash-dotted box.

FIG. 3 illustrates another cross section of a rock drilling machine equipped with the valve according to the invention, wherein the valve is indicated with a dash-dotted box. For the sake of clarity, the reference numbers inside the dash-dot box, which indicates the structures of the valve 6, are not all indicated in FIG. 3, because the reference numbers are already described in FIGS. 1a to 1d. Pressure arrangement PA and tank arrangement TA are indicated in FIG. 3 with dash-dotted ellipses. In FIG. 3 the hydraulically striking device is illustrated with a cross-section from a different direction. The rock drilling machine comprises a piston 3 that moves inside the rock drilling machine in a reciprocating manner, which piston 3 comprises an inner end 190 located inside the rock drilling machine, a second portion 19, which is arranged to the piston 3 to extend after the inner end in a larger diameter than the inner end 190, wherein the rock drilling machine comprises an inner return space TI located inside the rock drilling machine around the second portion 19 of the piston 3, wherein the inner end 190 moves along with the piston 3 inside the valve 6 in the inner space 30 and the second portion 19 moves along with the piston in the inner return space TI of the rock drilling machine, wherein the inner return space TI is connected to the same pressure as effected in the return space 40, 70 via the return channel 90 in the return arrangement TA. FIG. 3 clearly illustrates that return channel connects to the same pressure as in the inner return space TI. This connection is indicated with a dashed double line equipped with a double-arrow in FIG. 3. The way pressure enters from the pressure line P and is conducted to the pressure channel 100 in pressure arrangement PA is also illustrated in FIG. 3.

Figure 4:
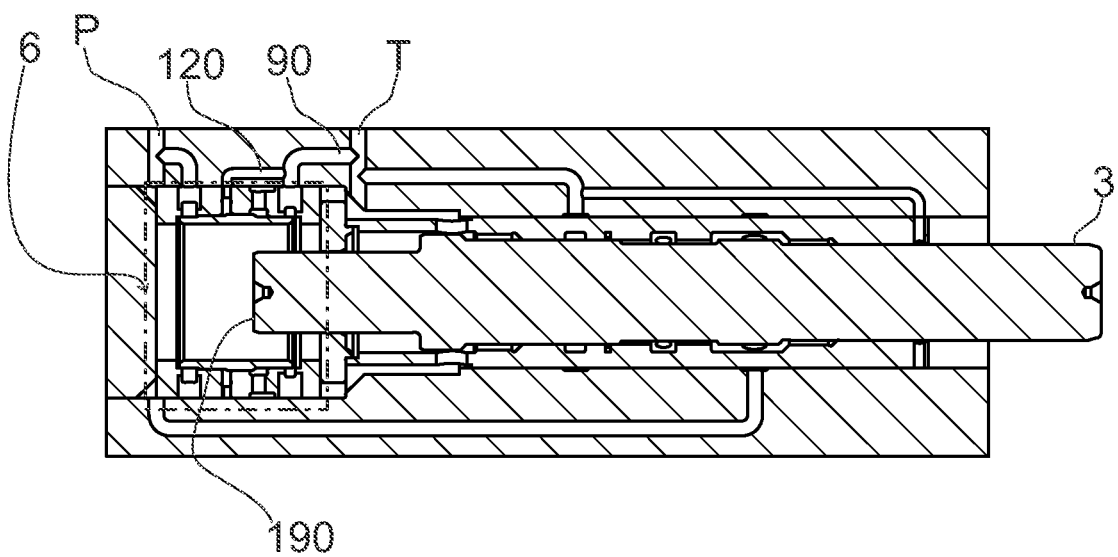
FIG. 4 is an illustration of a cross section of another hydraulically striking device and a valve.

FIG. 4 illustrates another example of a valve 6 of a hydraulically striking device, where FIG. 4a shows the first position of the piston 3 and FIG. 4b shows the second position of the piston 3, where the valve 6 is indicated inside a dashed-dotted box. There the return channel 90 is not arranged in the valve 6 housing 1000 but in the housing of the hydraulically striking device. Also the connecting channel 120 is arranged outside the valve 6 in the housing of the hydraulically striking device. The pressure line P and the return line T are referenced with same letters P and T as in FIGS. 1a to 1d. The function of the valve 6 in FIG. 4 is similar to the valve 6 in FIGS. 1a to 1d and 2a and 2b. Therefore, only the parts that differ from FIGS. 1a to 1d and 2a and 2b are referenced by numbers, and also to illustrate the difference between the examples.

A method is disclosed for manufacturing a valve 6 of a hydraulically striking device comprising a housing 1000, the housing 1000 comprising moving member 14 being seated inside the housing 1000 to be moved in a reciprocating manner by means of a hydraulic fluid, the moving member 14 comprising an inner space 30, the valve 6 comprising at least a first return space 40 and a first pressure space 50 provided, in the axial direction, at a distance from one another on the inner surface of the housing 1000 facing the moving member 14, wherein the rest of the inner surface of the housing 1000 in the same axial positions forms guide surfaces 6, 160 that are concentric with the moving member 14 and against the moving member 14 for centering the moving member 14. The moving member 14 is arranged alternately to open, in different positions of the moving member 14, the connection of the return space 40 and of the pressure space 50 to the inner space 30. The return space 40 is formed by making in the housing 1000 an axial groove of the return space that is non-central relative to the moving member, and the pressure space 50 is formed by making in the housing 1000 an axial groove of the pressure space that is non-central relative to the moving member 14.

The moving member 14 can be implemented in different ways. The moving member 14 can be a spool of the valve or a poppet of the valve or a combination of a spool and a poppet of the valve. In the examples of the invention, the moving member is the combination of a spool and a poppet of the valve 6, which reciprocates inside the housing 1000 and alternately seals itself towards the sealing surfaces 140, 150.

This invention is particularly useful in equipment wherein the valve 6 of a hydraulically striking device is used in hydraulic machines that are for example working in the rock drilling or similar applications.

It is understood that with the advancement of technology, the basic idea of the invention may be implemented in various ways. The invention and its embodiments are thus not limited to the examples described above, instead they may vary within the scope of the claims.

The embodiments of the invention described herein may be used in any combination with each other. Several or at least two of the embodiments may be combined together to form a further embodiment of the invention. A method or a device to which the invention is related may comprise at least one of the embodiments of the invention described hereinbefore.

It is to be understood that any of the above embodiments or modifications can be applied singly or in combination to the respective aspects to which they refer, unless they are explicitly stated as excluding alternatives.

What is claimed:

1. A valve of a hydraulically striking device comprising a housing comprising a moving member being seated inside the housing to be moved in a reciprocating manner by means of a hydraulic fluid, wherein the moving member comprises an inner space,
   wherein the valve comprises at least a first return space and a first pressure space provided, in the axial direction, at a distance from one another on an inner surface of the housing facing the moving member,
   wherein the rest of the inner surface of the housing in the same axial positions of the first return space and the first pressure space forms guide surfaces that are concentric with the moving member and against the moving member and that are arranged for centering the moving member,
   wherein the pressure space and the return space are axial grooves made in the housing.

2. The valve according to claim 1, wherein the valve further comprises
   at least one second return space and at least one second pressure space provided, in the axial direction, at a distance from one another on the inner surface of the housing facing the moving member,
   wherein guide surfaces of the return space that are concentric with the moving member and against the moving member are formed between the first return space and the second return space and are arranged for centering the moving member, and
   wherein guide surfaces of the pressure space that are concentric with the moving member and against the moving member are formed between the first pressure space and the second pressure space and are arranged for centering the moving member.

3. The valve according to claim 1, wherein the guide surfaces are formed substantially near the ends of the moving member.

4. The valve according to claim 1, wherein at least one return channel opens into the return space and at least one pressure channel opens into the pressure space, the channels being disposed axially relative to the moving member.

5. The valve according to claim 4, wherein the housing further comprises a groove into which a connecting channel opens and is arranged to be connected axially to the return channel and to the return space.

6. The valve according to claim 5, wherein the position of the return channel and of the connecting channel in the housing is provided according to the position of the return space, and the position of the pressure channel in the housing is provided according to the position of the pressure space.

7. The valve according to claim 1, wherein the return space and the pressure space are provided symmetrically in the housing around the moving member.

8. The valve according to claim 1, wherein the housing comprises a first sealing surface and a second sealing surface, wherein the moving member moves between the sealing surfaces.

9. The valve according to claim 1, wherein the housing further comprises a control groove, wherein a control surface area of the pressure in the control groove for moving the moving member is greater than a surface area of the pressure for moving the moving member.

10. The valve according to claim 1, wherein the housing is annular and acts as a valve casing.

11. The valve according to claim 1, wherein the moving member is annular.

12. The valve according to claim 1, wherein the return space and the pressure space are provided in the housing non-centrally relative to the moving member.

13. The valve according to claim 1, wherein the moving member is a spool of the valve or a poppet of the valve or a combination of a spool and a poppet of the valve.

14. The valve according to claim 1, wherein the valve is a valve of a rock drilling machine.

15. The rock drilling machine according to claim 14, wherein the rock drilling machine comprises a piston configured to move inside the rock drilling machine in a reciprocating manner,
   wherein the piston comprises
      an inner end located inside the rock drilling machine,
      a second portion, which is arranged to the piston to extend after the inner end in a larger diameter than the inner end,
   wherein the rock drilling machine comprises an inner return space located inside the rock drilling machine around the second portion of the piston, wherein the inner end moves along with the piston inside the valve in the inner space and the second portion moves along with the piston in the inner return space of the rock drilling machine, wherein the inner return space is connected to the same pressure as effected in the return space via the return channel.

16. A method for manufacturing the valve according to claim 1, wherein the return space is formed by making in the housing an axial groove of the return space that is non-central relative to the moving member, and the pressure space is formed by making in the housing an axial groove of the pressure space that is non-central relative to the moving member.

17. The valve according to claim 2, wherein the guide surfaces are formed substantially near the ends of the moving member.

18. The valve according to claim 2, wherein at least one return channel opens into the return space and at least one pressure channel opens into the pressure space, the channels being disposed axially relative to the moving member.

19. The valve according to claim 3, wherein at least one return channel opens into the return space and at least one pressure channel opens into the pressure space, the channels being disposed axially relative to the moving member.

* * * * *